United States Patent
Stephenson et al.

(10) Patent No.: US 6,999,142 B2
(45) Date of Patent: Feb. 14, 2006

(54) REFLECTIVE CHOLESTERIC LIQUID CRYSTAL DISPLAY WITH COMPLEMENTARY LIGHT-ABSORBING LAYER

(75) Inventors: Stanley W. Stephenson, Spencerport, NY (US); Terry J. Martin, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/144,314

(22) Filed: Jun. 3, 2005

(65) Prior Publication Data

US 2005/0225703 A1   Oct. 13, 2005

Related U.S. Application Data

(62) Division of application No. 10/455,050, filed on Jun. 5, 2003.

(51) Int. Cl.
G02F 1/1335 (2006.01)
G02F 1/1333 (2006.01)
C09K 19/02 (2006.01)
C09K 19/52 (2006.01)

(52) U.S. Cl. ............... 349/113; 349/86; 349/169; 349/176; 349/185; 252/299.01

(58) Field of Classification Search ............... 349/86, 349/113, 169, 175, 176, 185; 252/299.01
See application file for complete search history.

(56) References Cited

U.S. PATENT DOCUMENTS

| | | | | |
|---|---|---|---|---|
| 5,437,811 A | * | 8/1995 | Doane et al. | 252/299.01 |
| 5,532,851 A | * | 7/1996 | Usami | 349/117 |
| 5,691,790 A | * | 11/1997 | Havens et al. | 349/113 |
| 6,359,673 B1 | * | 3/2002 | Stephenson | 349/185 |
| 6,392,725 B1 | * | 5/2002 | Harada et al. | 349/74 |
| 6,433,843 B1 | * | 8/2002 | Okada et al. | 349/78 |
| 6,639,637 B1 | * | 10/2003 | Stephenson | 349/86 |
| 6,667,785 B1 | * | 12/2003 | Stephenson | 349/86 |
| 6,690,447 B1 | * | 2/2004 | Stephenson et al. | 349/187 |
| 2001/0033351 A1 | * | 10/2001 | Takami et al. | 349/113 |

FOREIGN PATENT DOCUMENTS

EP   1115026 A2 *  7/2001

\* cited by examiner

Primary Examiner—Tarifur R. Chowdhury
(74) Attorney, Agent, or Firm—Chris P. Kankol

(57) ABSTRACT

A display sheet comprising a substrate carrying layers of material; including a polymer-dispersed cholesteric liquid-crystal layer having a first high reflection state within a portion of the visible light spectrum and a second less-reflective state in said spectrum, said states being changeable by electric field between the two states which states can be maintained in the absence of an electric field; a first transparent conductor disposed over the polymer-dispersed cholesteric liquid-crystal layer; a complementary light-absorbing layer below the polymer-dispersed cholesteric liquid-crystal layer having relatively high light absorption within the spectrum of the high-reflection state of the polymer-dispersed cholesteric liquid-crystal layer and having relatively less light absorption in the spectrum complementary to that of the high reflection state of the polymer-dispersed cholesteric liquid-crystal layer; and a reflective second conductor under said complementary light-absorbing layer reflecting light received from the complementary light-absorbing layer back through the complementary light-absorbing layer.

12 Claims, 8 Drawing Sheets

PLANAR

FOCAL-CONIC

FIG. 1

PLANAR          FOCAL-CONIC

REFLECTIVE CHOLESTERIC LIQUID CRYSTAL DISPLAY WITH COMPLEMENTARY LIGHT-ABSORBING LAYER

CROSS REFERENCE TO RELATED APPLICATIONS

This is a divisional of application Ser. No. 10/455,050, filed Jun. 4, 2003.

Reference is made to commonly-assigned U.S. patent application Ser. No. 09/799,220 filed Mar. 5, 2001, U.S. patent application Ser. No. 09/915,441 filed Jul. 26, 2001, U.S. patent application Ser. No. 10/036,149 filed Dec. 26, 2001.

FIELD OF THE INVENTION

The present invention relates to a display sheet having a cholesteric liquid-crystal layer that can change states, a relatively lighter (brighter) state and a relatively darker state, to provide a viewable image. In particular, the invention relates to a display sheet in which the relatively lighter state exhibits a more neutral appearance.

BACKGROUND OF THE INVENTION

Currently, information is displayed using assembled sheets of paper carrying permanent inks or displayed on electronically modulated surfaces such as cathode ray displays or liquid crystal displays. Printed information cannot be changed. Electrically updated displays are heavy and expensive. Other sheet materials can carry magnetically written areas to carry ticketing or financial information, however magnetically written data is not visible.

Media systems exist that maintain electronically changeable data without power. Such system can be electrophoretic (Eink), Gyricon or polymer dispersed cholesteric materials. An example of electronically updateable display can be found in U.S. Pat. No. 3,600,060 issued Aug. 17, 1971 to Churchill that shows a device having a coated then dried emulsion of cholesteric liquid crystals in aqueous gelatin to form a field responsive, bistable display. U.S. Pat. No. 3,816,786 discloses a layer of encapsulated cholesteric liquid crystal responsive to an electric field. The electrodes in the patent can be transparent or non-transparent and formed of various metals or graphite. It is disclosed that one electrode must be light absorbing and it is suggested that the light absorbing electrode be prepared from paints contains conductive material such as carbon.

Fabrication of flexible, electronically written display sheets is disclosed in U.S. Pat. No. 4,435,047 issued Mar. 6, 1984 to Fergason. A substrate supports a first conductive electrode, one or more layers of encapsulated liquid crystals, and a second electrode of electrically conductive ink. The conductive inks form a background for absorbing light, so that the display areas appear dark in contrast to non-display areas. Electrical potential applied to opposing conductive areas operates on the liquid crystal material to expose display areas. Because the liquid crystal material is nematic liquid crystal, the display ceases to present an image when de-energized.

The Fergason patent discloses the use of nematic liquid crystal, which absorbs light and does not maintain an image in the absence of a field. Dyes in either the polymer encapsulant or liquid crystal are used to absorb incident light. The dyes are part of a solution, and not solid sub-micrometer particles. The patent further discloses the use of a chiral dopant in Example 2. The dopant improves the response time of the nematic liquid crystal, but does not operate in a light-reflective state.

U.S. Pat. No. 5,251,048 discloses a light-modulating cell having a polymer-dispersed chiral-nematic liquid crystal material. The chiral-nematic liquid-crystal material has the property of being electrically driven between a planar state reflecting a specific spectrum of visible wavelength of light and a light scattering focal-conic state. Chiral-nematic liquid-crystals, also referred to as cholesteric liquid crystals, have the capacity of maintaining (in a stable state) one of a plurality of given states in the absence of an electric field. Black paint is applied to the outer surface of a rear substrate in the cell to provide a light-absorbing layer outside of the area defined by the intersection of segment lines and scanning lines.

Cholesteric liquid crystals reflect a portion of the visible spectrum when in a reflective state. It is preferable that the reflective state have neutral color balance. It would be useful to provide cholesteric displays exhibiting neutral density in the reflective state. It would be useful for such display to be fabricated using simple, low-cost processes.

SUMMARY OF THE INVENTION

It is an object of this invention to provide displays that generate a light reflection that is a substantially color neutral when the liquid crystal in such displays are in the bright state.

It is a further object of the invention to provide a complementary colored layer that operates in conjunction with a reflective surface, preferably a reflective surface of an electrode, to create a color-neutral reflective image area in the display.

These objects are achieved in a display sheet comprising:
a) a substrate for carrying layers of material;
b) an imaging layer comprising polymer-dispersed cholesteric liquid-crystal material, such imaging layer having a first relatively higher reflection state within a portion of the visible light spectrum defining an operating spectrum and a second relatively less reflective state in said operating spectrum, wherein said states are capable of being changed by an electric field between the two states, which states are capable of being maintained as a stable state in the absence of an electric field;
c) a first transparent conductor disposed on one side of the imaging layer;
d) a complementary light-absorbing layer, on the other side of the imaging layer, that provides relatively lower transmission of light within the operating spectrum of the imaging layer and relatively greater transmission of light outside of the operating spectrum; and
e) a reflective surface, optionally part of a second electrode, that is capable of reflecting light transmitted through the complementary light-absorbing layer back through the complementary light-absorbing layer; and
f) a second electrode.

The present invention provides a bright, color-neutral image area when the image area is in the planar state. The display can be formed using simple, room-temperature processes. Sub-micrometer particles of pigment in a binder provide an electrochemically stable light-absorbing material as a thin layer having little effect on drive voltages. The complementary light-absorbing material, comprising a pigment and/or dye, can be coated simultaneously with a polymer-dispersed cholesteric liquid crystal, preferably an aqueous binder-dispersed cholesteric liquid crystal.

DETAILED DESCRIPTION OF THE PREFERRED EMBODIMENT

Figure 1:
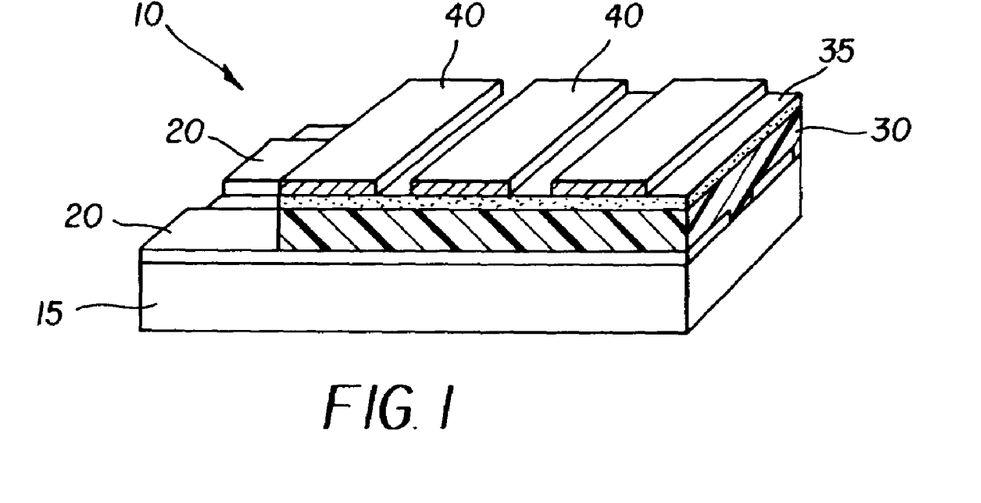
FIG. 1 is a perspective section view of a first polymer-dispersed cholesteric liquid-crystal display in accordance with the present invention.

FIG. 1 is a perspective section view of one embodiment of a first polymer-dispersed cholesteric display in accordance with the present invention. A sheet designated as display 10 includes a display substrate 15, which in one embodiment can be a thin transparent polymeric material. One such material is Kodak Estar® film base formed of polyester plastic that has a thickness of between 20 and 200 micrometers. For example, the display substrate 15 can be a 125-micrometer thick sheet of polyester film base. Other polymers, such as transparent polycarbonate, can also be used.

One or more first conductors 20 are formed on display substrate 15. First conductors 20 can be tin-oxide, indium-tin-oxide (ITO), or polythiophene, with ITO being the preferred material. Typically the material of first conductors 20 is sputtered or coated as a layer over display substrate 15 and has a resistance of less than 1000 ohms per square. First conductors 20 can be formed in a conductive layer, for example, by conventional lithographic or laser etching means. Transparent first conductors 20 can also be formed by printing a transparent organic conductor such as PEDT/PSS, PEDOT/PSS polymer, which materials are sold as Baytron® P by Bayer AG Electronic Chemicals.

Cholesteric liquid-crystal layer 30 overlays first conductors 20. The cholesteric liquid-crystal layer 30 can contain cholesteric liquid-crystal material such as those disclosed in U.S. Pat. No. 5,695,682 issued Dec. 9, 1997 to Doane et al., the disclosure of which is incorporated by reference. Such materials are made using highly anisotropic nematic liquid-crystal mixtures and adding a chiral doping agent to provide helical twist, in the planes of the liquid crystal, to the point that interference patterns are created that reflect incident light. Application of electrical fields of various intensity and duration can be employed to drive a chiral-nematic (cholesteric) liquid-crystal material into a reflective state, into near transparent/transmissive state, or into an intermediate state. These materials have the advantage of having first and second optical states that are both stable in the absence of an electrical field. The materials can maintain a given optical state indefinitely after the field is removed. Cholesteric liquid-crystal materials can be formed using a two-component system such as MDA-00-1444 (undoped nematic) and MDA-00-4042 (nematic with high chiral dopant concentrations) available from E. M. Industries of Hawthorne, N.Y.

In a preferred embodiment, cholesteric liquid-crystal layer 30 is a cholesteric liquid-crystal material dispersed in gelatin, preferably deionized photographic-grade gelatin. For example, the liquid-crystal material is mixed at 8% cholesteric liquid crystal in a 5% gelatin aqueous solution. The mixture is dispersed to create an emulsion having 8–10 micrometer diameter domains of the liquid crystal in aqueous suspension. The domains can be formed using the limited coalescence technique described in copending U.S. patent application Ser. No. 09/478,683 filed Jan. 6, 2000 by Stephenson et al. The emulsion can be coated over first conductors 20 on a polyester display substrate 15 and dried to provide an approximately 9-micrometer thick polymer dispersed cholesteric coating. Other organic binders such as polyvinyl alcohol (PVA) or polyethylene oxide (PEO) can be used in place of the gelatin. Such emulsions are machine coatable using coating equipment of the type employed in the manufacture of photographic films. A gel sublayer can be applied over first conductors 20 prior to applying cholesteric layer 30 as disclosed in U.S. Pat. No. 6,423,368 by Stephenson et al.

Figure 2:
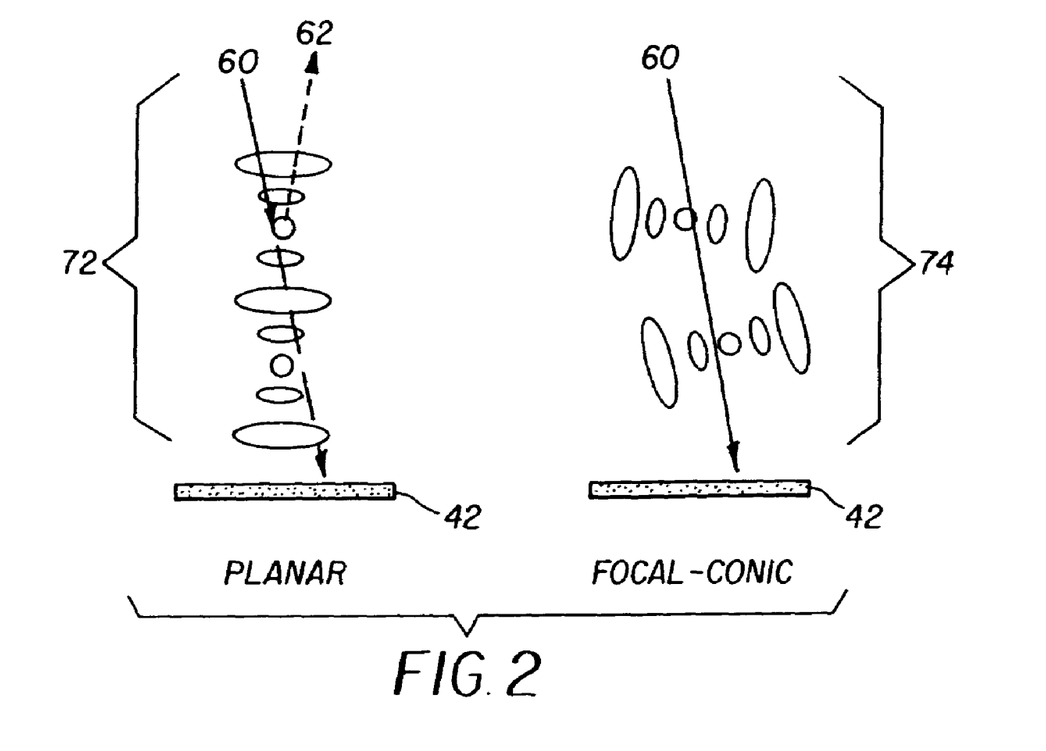
FIG. 2 is a schematic sectional view of a cholesteric ("chiral-nematic") liquid-crystal material in a planar and focal-conic state and responding to incident light consistent with prior-art displays.

FIG. 2 is a schematic diagram of a chiral-nematic liquid-crystal material, respectively, in a planar and focal-conic state responding to incident light in accordance with prior-art knowledge. In the figure on the left, after a high voltage field has been applied and quickly switched to zero potential, the liquid-crystal molecules align as planar liquid crystals 72, which reflect portions of incident light 60 as planar reflective light 62. The chiral dopant concentration defines the peak reflection. The bandwidth around the peak reflection is proportional to the optical birefringence of the nematic liquid crystal. In the figure on the right side of FIG. 2, an application of a lower voltage field causes molecules of the chiral-nematic liquid-crystal material to break into tilted cells known as focal conic liquid crystals 74. The orientation of the focal-conic material is nearly transparent or scattering/transmissive rather than reflective. Changes in the low-voltage time duration permits molecules to assume orientations between reflective planar state 72 and the light scattering focal conic state 74.

In the fully evolved focal-conic state 74, the cholesteric liquid crystal is light scattering and incident light 60 is forward scattered and can be absorbed by a light absorber 42 to create the appearance of a black (or blackish-dark) image area. Progressive evolution from a planar to focal-conic state causes a viewer to perceive a bright planar reflective light 62 that transitions to black as the cholesteric material changes from reflective planar state 72 to a fully evolved light-scattering focal-conic state 74. When the field is removed, cholesteric liquid-crystal layer 30 maintains a given optical state indefinitely. The states are more fully discussed in U.S. Pat. No. 5,437,811 issued Aug. 1, 1995 to Doane et al.

Figure 3:
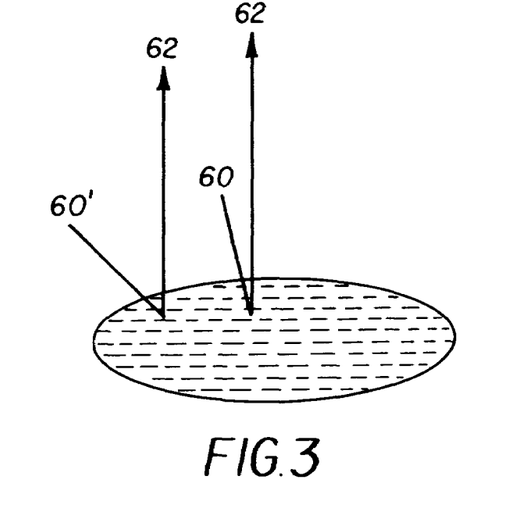
FIG. 3 is a sectional view of a domain containing cholesteric liquid material.

FIG. 3 is a sectional view of a domain containing cholesteric liquid-crystal material. Cholesteric liquid-crystal material anchors against an arcuate surface. Incident light 60 can strike the domain at oblique angle 60' or a relatively perpendicular angle 60. Light striking cholesteric material at an oblique angle reflects light at a shorter wavelength. The peak reflected wavelength and bandwidth of light is a function of both the cholesteric liquid-crystal material properties and domain size and shape.

Figure 4:
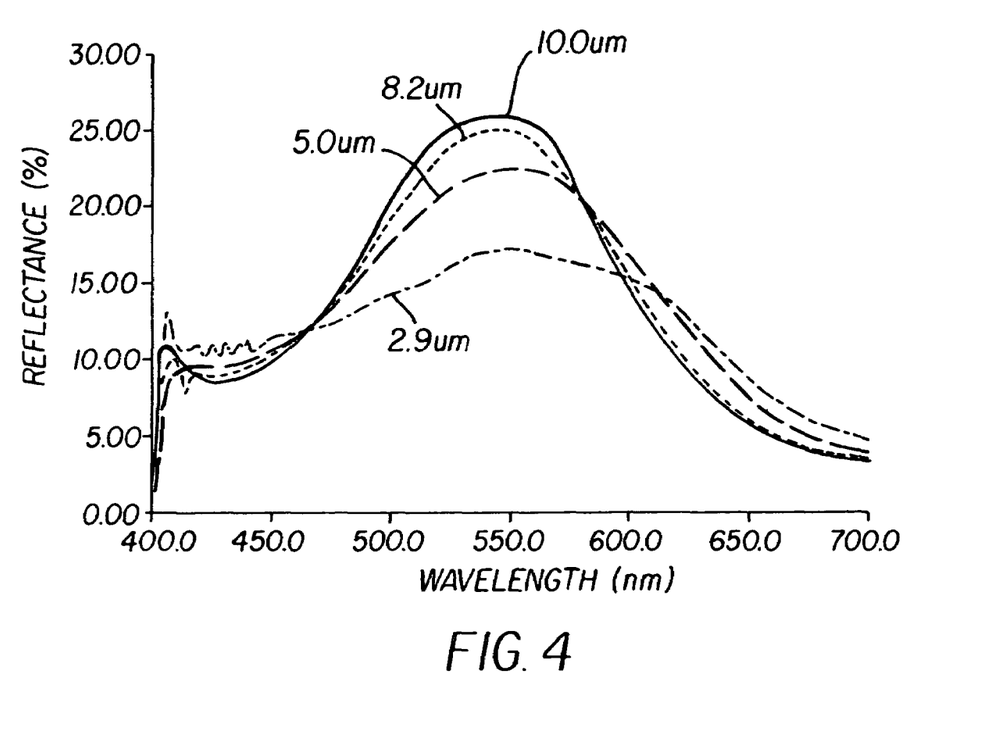
FIG. 4 is a plot of the spectral distribution of polymer-dispersed cholesteric liquid crystal with varying domain sizes.

FIG. 4 is a plot of the spectral distribution of polymer-dispersed cholesteric liquid crystal with varying domain sizes as measured by a spectrophotometer. The cholesteric liquid crystal measured was Merck BL-118, which has a peak reflection of 550 nanometers when measured between two flat glass slides. The cholesteric liquid-crystal material was dispersed in a gelatin-containing water bath, and a constant quantity was coated and dried over ITO conductors. A second conductor was printed over the dried cholesteric coating, and the material was switched into the planar (reflective) state to measure reflectance. Spectral distribution was measured for domains having diameters of 2.9, 5.0, 8.2 and 10.0 micrometers as emulsions. The domains flatten when dried, which have a surface of varying tilt. As domain size increased, the planar reflected light increased. As evident by FIG. 4, the spectral distributions had a 5 nanometer shift in peak reflectance to shorter wavelength due to anchoring of the planar liquid crystal on an arcuate surface reflecting shorter wavelengths of light, which may be taken into account when designing displays. Preferably, the display sheet comprises polymer-dispersed cholesteric liquid-crystal material with a peak reflected wavelength between 570 and 590 nanometers.

Returning to FIG. 1, complementary light-absorbing layer 35 overlays cholesteric liquid-crystal material 30. In the preferred embodiment, complementary light-absorbing layer 35 is composed of pigments that are milled below 1 micrometer to form "nano-pigments" in a binder. Such pigments are very effective in absorbing wavelengths of light in very thin (sub-micrometer) layers. Such pigments can be selected to be electrically inert to prevent degradation and interference with electrical display fields applied to display 10. Such pigments are disclosed in copending U.S. patent application Ser. No. 10/222,396 filed Aug. 16, 2002, hereby incorporated by reference. The filter layer can comprise two or more differently hued pigments.

In the preferred embodiment, complementary light-absorbing layer 35 absorbs the majority of light normally reflected by liquid crystals in the planar state and transmits a portion of light not reflected by cholesteric liquid-crystal layer 30. Complementary light-absorbing layer 35 should be as thin as possible to minimize drive voltage while providing an acceptable degree of light absorption. Pigments are extremely efficient light absorbers and ideally suited for this purpose. In the preferred embodiment, cholesteric liquid-crystal layer 30 is between 4 and 10 micrometers thick. The state changing field for cholesteric liquid-crystal materials is typically 10 volts per micrometer coating thickness. Because complementary light-absorbing layer 35 is disposed between the two field-carrying conductors, the layer should be significantly thinner than the cholesteric liquid-crystal layer 30. In practice, complementary light-absorbing layer 35 should be less than about 1 micrometers, preferably 0.5 micrometers or less in thickness. The amount of binder in complementary light-absorbing layer 35 should also be low to minimize any increase in drive voltage. It was found that a gelatin binder at a 1:1 ratio with the pigment can provide a layer with good bond strength to subsequently applied layers and minimize increases in drive voltage.

In the present invention, complementary light-absorbing layer 35 is coated over cholesteric liquid-crystal layer 30 to provide a light-absorbing layer 35 that provides a high-contrast dark image area in the focal conic state relative to planar reflective light. Complementary light-absorbing layer 35 further provides in the planar state (via selective transmission of light that can be reflected by an underlying reflective surface) a pre-designed amount of light at wavelengths not operated on by the cholesteric liquid crystal. The complementary light-absorbing layer 35 can be coated simultaneously with the deposition of cholesteric liquid-crystal layer 30 or in a separate step. In a preferred embodiment, multi-layer coating equipment such as used in making photographic imaging elements provides cholesteric liquid-crystal layer 30 and complementary light-absorbing layer 35 as two co-deposited layers. Complementary light-absorbing layer 35 is significantly thinner than cholesteric layer 30 and, therefore, as mentioned above, has minimal effect on the electrical field strength required to change the state of the cholesteric liquid-crystal material in the manufactured display.

Continuing to refer to the embodiment of FIG. 1, second conductors 40 overlay complementary light-absorbing layer 35. Second conductors 40 have sufficient conductivity to induce an electric field across cholesteric liquid-crystal layer 30, which field is strong enough to change the optical state of the polymeric-dispersed liquid-crystal material. Second conductors 40 in this embodiment are formed of reflective metal, for example, by vacuum deposition of conductive and reflective material such as aluminum, silver, chrome or nickel. In the case of vacuum coated second conductors 40, aluminum or silver provide very high reflectance and conductivity. The layer of conductive material can be patterned using well known techniques of photolithography, laser etching or by application through a mask. Alternatively, a thin reflective layer of a material can be applied before application of a less reflective conductive material to maximize reflection.

In another embodiment, second conductors 40 are formed by screen printing a reflective and conductive formulation such as UVAGO® 0010 material from Allied Photochemical of Kimball, Mich. Such screen printable conductive materials comprise finely divided silver in an ultraviolet curable resin. After printing, when the material is exposed to ultraviolet radiation greater than 0.40 Joules/cm$^2$, the resin will polymerize in about two seconds to form a durable surface. Screen printing is preferred to minimize the cost of manufacturing the display. Providing a sufficient amount of polymer to pigment in complementary light-absorbing layer 35 creates a printable surface on second conductors 40. Alternatively, second conductors 40 can be formed by screen printing thermally cured silver-bearing resins. An example of such a material is Acheson Electrodag® 461 SS, a heat-cured silver ink. The first and second conductors can be patterned to produce an addressable matrix.

Figure 5:
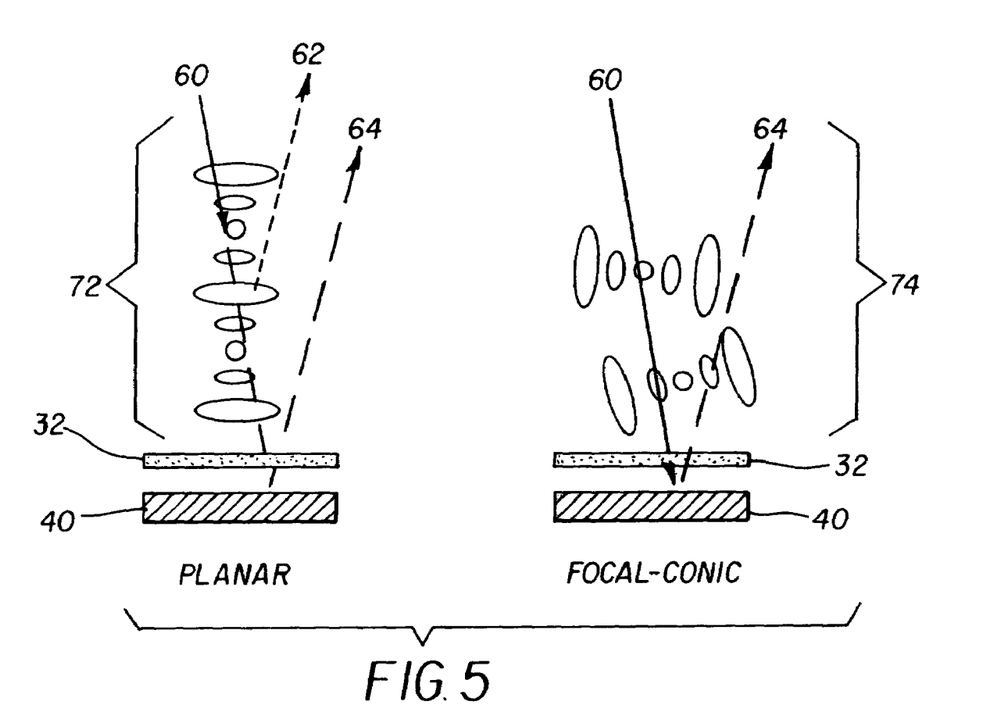
FIG. 5 is a schematic sectional view of optical states of a display in accordance with the present invention.

FIG. 5 is a schematic section view of optical states of a display in accordance with the present invention. The left diagram demonstrates the optical path when the cholesteric liquid-crystal material is in the planar state. Incident light 60 strikes planar liquid crystal 72 which reflects a portion of the incident light 60 as planar reflective light 62. The remaining light passes through complementary light-absorbing layer 32. A portion of the light passing though complementary light-absorbing layer 32 is absorbed, and the remaining light strikes reflective second conductor 40. Light is reflected from second conductor 40, passes through complementary light-absorbing layer 32 a second time, and then passes through planar liquid-crystal material 72 to become complementary light 64. On the right side of FIG. 5, the liquid-crystal material is in the focal-conic state and complementary light-absorbing layer 32 absorbs wavelengths of light reflected in planar state 72. Light outside cholesteric liquid-crystal substantially reflective wavelengths continues to provide complementary light 64 when the liquid-crystal material is in focal conic 74.

Figure 6:
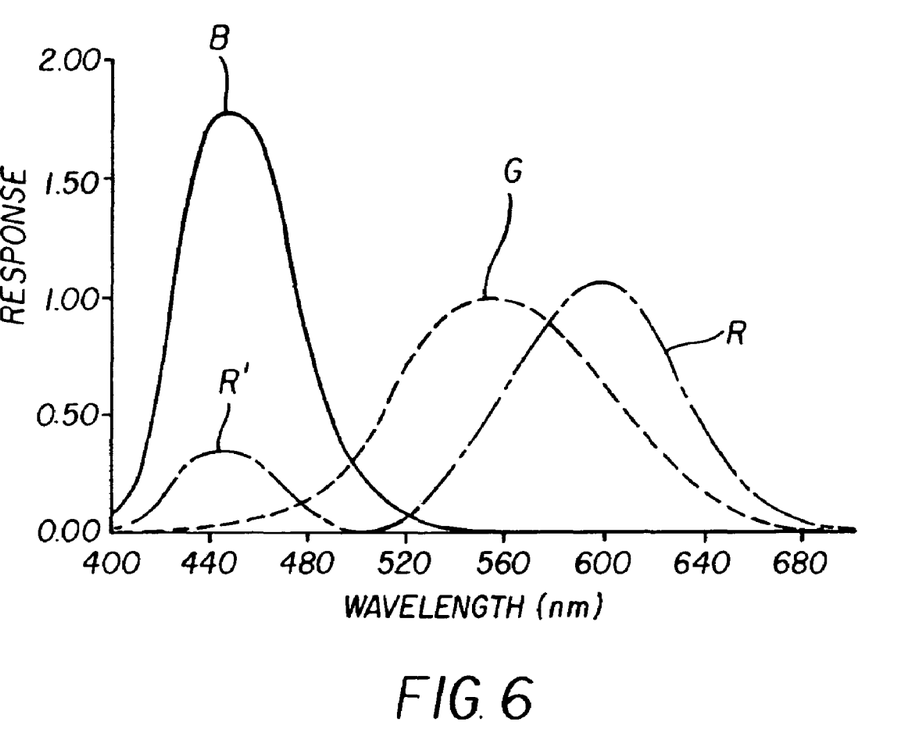
FIG. 6 is a the 1931 CIE color matching function of the human eye.

FIG. 6 is a plot of the response of the three color "channels" (red, green and blue) of the human eye, the "channels" referring to the different types of photoreceptors (cones) contained in the retina of the human eye. The plot is taken from the 1931 CIE Standard Colorimetric observer. Light reflected from display accordingly to the present invention optimally has about equal excitation (area under the curve) of all three color channels and, therefore, appears neutral (white/grey). Cholesteric liquid crystals have about a 100 nanometer bandwidth. It is preferable to select a peak wavelength in that region to maximize brightness. The peak wavelength that has the greatest excitation for such a bandwidth is at approximately 580 nanometers. At that wavelength, excitation of the green (G) and red (R) receptors overlap and are commonly excited by light at wavelengths between 530 and 630 nanometers.

Figure 7:
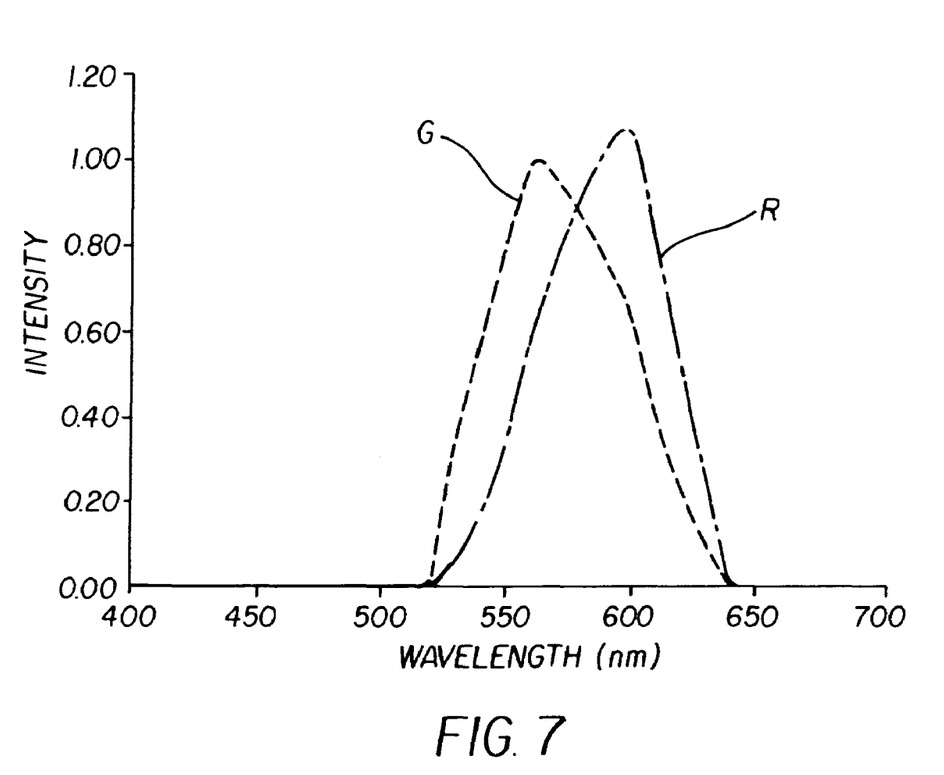
FIG. 7 is a plot of the human eye response to a theoretical cholesteric liquid-crystal having a peak reflection of 582 nanometers.

FIG. 7 is a plot of the human-eye response to a cholesteric liquid crystal having a peak reflection of 582 nanometers and a 100-nanometer bandwidth. The excitation of the green and red channels, as expressed by the area under the green (G) and red (R) curves is about equal. If an equal area of blue light is presented to a viewer, then the total light will have a neutral (white/grey) hue.

Figure 8:
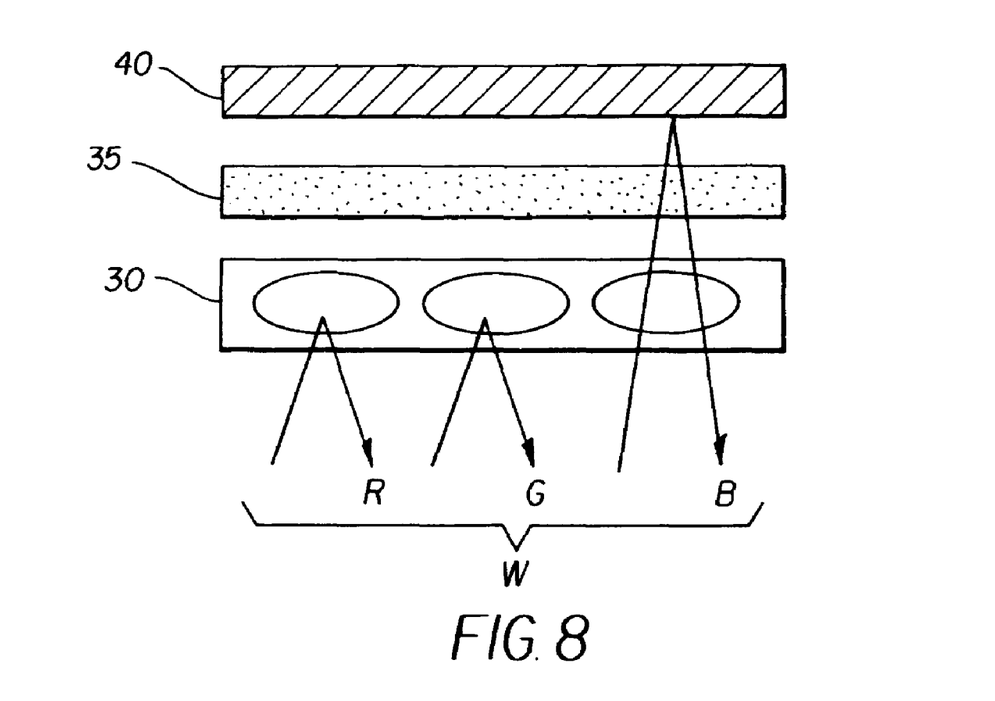
FIG. 8 is the optical response of a display sheet in the planar state in accordance to the present invention.

FIG. 8 is the optical response of one embodiment of a display sheet in the planar state in accordance with one embodiment of the present invention. The peak reflection of the planar state of the liquid crystal is set so that light exciting both green (G) and red (R) portions of the visual spectrum are excited. Complementary light-absorbing layer 35 can be a coating comprising one or more pigments/dyes that is designed to reflect a portion of blue (B) light to create light that yields a substantially neutral or whitish color (W). When the liquid-crystal material is in the planar state, the total reflected light, accordingly, comprises both (1) the liquid-crystal-derived reflected light and (2) the light transmitted by the light-absorbing layer and reflected by the reflective surface. The latte reflected light can also be referred to as the color-filtered second reflected light, since the light-absorbing layer can functions as a color filter.

Figure 9:
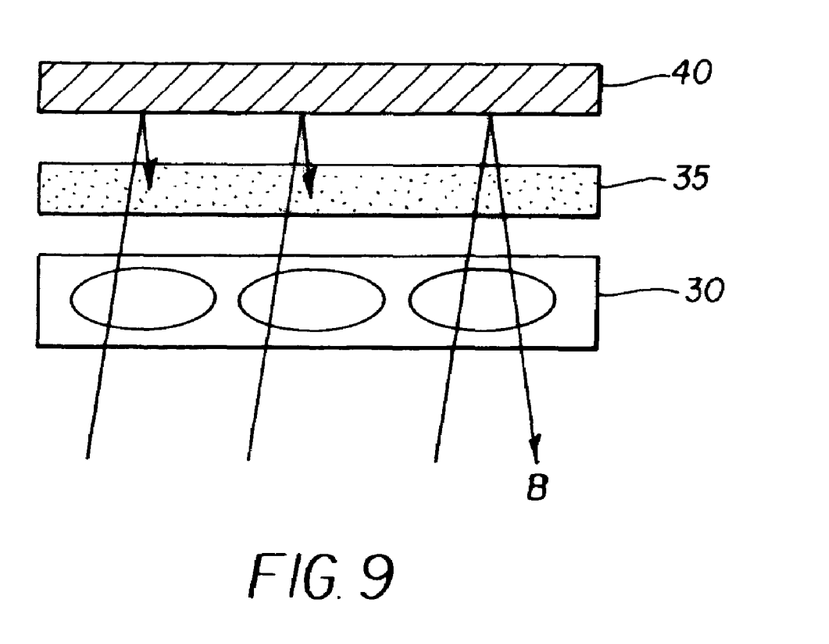
FIG. 9 is the optical response of the display sheet of FIG. 8 in the focal-conic state.

FIG. 9 is the optical response of the display sheet of FIG. 8 when the liquid crystal is in the focal-conic state. Complementary light-absorbing layer 35 absorbs substantial amounts of light of wavelengths of light, in this case red (R) and green (G), reflected in the planar state. A portion of the blue (B) light is reflected to create a blue or bluish image layer. The display thereby can switch between a neutral and dark-blue state by electrically switching a cholesteric liquid-crystal material between the planar and focal-conic state.

Returning to FIG. 8, a component of short-wavelength light, or blue (B) light, is added by the combination of complementary light-absorbing layer 35 and reflective second conductor 40. Referring to FIG. 6, it can be seen that the addition of the short-wavelength blue (B) light further excites red (R') receptors, increasing apparent red (R) color channel excitation. The peak wavelength of the cholesteric liquid-crystal material must, therefore, be adjusted to a shorter wavelength to increase the green light and decrease the red light, so that an effectively neutral display is created in the planar state with the addition of the blue light. The blue light component should approximately or substantially match the perceived intensity of the green and red components of light and provide a small amount of excitation to balance the red against the superior green intensity. Pigments suitable for the application are imperfect, and the final formulation for the various components is established by trial and the use of mathematical models.

In a preferred embodiment, reflected light from the display sheet when the imaging layer is in the first relatively higher reflection state has CIE tristimulus values X, Y and Z that are within 20 percent of each other. It is also preferred that when the liquid-crystal material is in the planar state, the total reflected light from the display sheet has CIE tristimulus values X, Y and Z that are 20 percent closer to each other than the CIE tristimulus values of the liquid-crystal-derived light alone without the color-filtered second reflected light. The X, Y, and Z values can be approximated based on measurements made on a tristimulus colorimeter R, G, B measurements, as will be understood by the skilled artisan.

EXAMPLE

An experiment was conducted to create a sheet in accordance to the present invention. The sheet was constructed using 300 ohm per square ITO over a 150 micrometer thick polyester sheet. A polymer-dispersed liquid-crystal cholesteric material in accordance with the previously described formulation was blended to have a peak wavelength of 575 nanometers. The cholesteric liquid-crystal material was dispersed in 8.3 micron domains and coated over the ITO conductor.

A complementary dye solution was made having 1.74% dissolved gelatin, 0.74% Sunfast Blue 15:4 milled to a 110 nanometer mean diameter and 0.1.55% Pigment Violet 29 milled to a 210 nanometer mean diameter. The solution was coated over the polymer-dispersed cholesteric liquid crystal at 10.76 grams per square meter and dried to form a complementary light-absorbing layer. The dried layer was less than 0.5 microns thick. Second conductors were printed over the complementary light-absorbing layer using such as UVAG® 0010 resinous material from Allied Photochemical of Kimball, Mich. After printing, the resinous material was exposed to ultraviolet radiation greater than 0.40 Joules/cm$^2$ to form a durable surface.

Prior experiments had determined that polymer-dispersed cholesteric liquid-crystal material in the experimental formulation reflected approximately 25% of light at 575 nanometers when the material was in the planar state. The effective reflectivity of the printed silver was found to be uniformly 65 percent across the visible spectrum. The dye concentration was selected so that the passage of light through the complementary light-absorbing layer, reflected by the printed silver second conductor and back through the complementary light-absorbing layer would have approximately 25% reflected blue light, as measured at the peak reflected wavelength of 450 nanometers.

Figure 10:
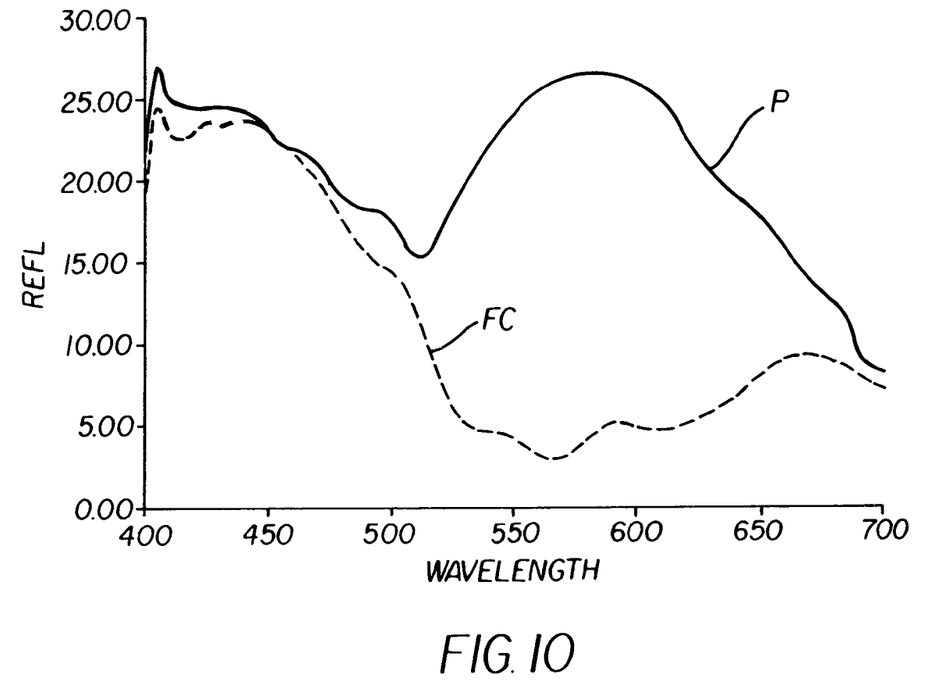
FIG. 10 is a plot of the reflection of light from one embodiment of a display sheet, when tested, according to the present invention.

FIG. 10 is a plot of the reflection of light from a test sheet for a display according to the present invention. In the planar state (P), the peak planar reflected light at 575 nanometers matched the reflected blue light from the complementary light-absorbing layer. When the test sheet was written into the focal-conic (FC) state the cholesteric liquid-crystal material is near transparent/transmissive, and the FC spectrum is a functional plot of the complementary light-absorbing layer working in combination with the printed silver reflector. The complementary light-absorbing layer is composed of cyan and magenta pigments which together have a high absorption of light in the spectrum reflected when the cholesteric liquid-crystal material is in the planar state. The magenta pigment, Pigment Violet 29 has a peak absorption at about 540 nanometers, and the cyan pigment, Sunfast Blue 15:4 has a peak absorption at 620 nanometers. It can be seen in FIG. 10 that the combination of the two pigments provides 95% light absorption from 525- to 635-nanometer wavelengths. The pigments have very high absorption in the areas that overlap, and peak at about 575 nanometers. The peak of reflected light, 25%, occurs in the blue region at about 450 nanometers to balance light reflected in the green and red portions of the visible spectrum. Portions of the visible spectrum not operated on by the cholesteric liquid-crystal material, in this case the blue portion, are constant reflectance regardless of the state of the cholesteric liquid-crystal material.

Figure 11:
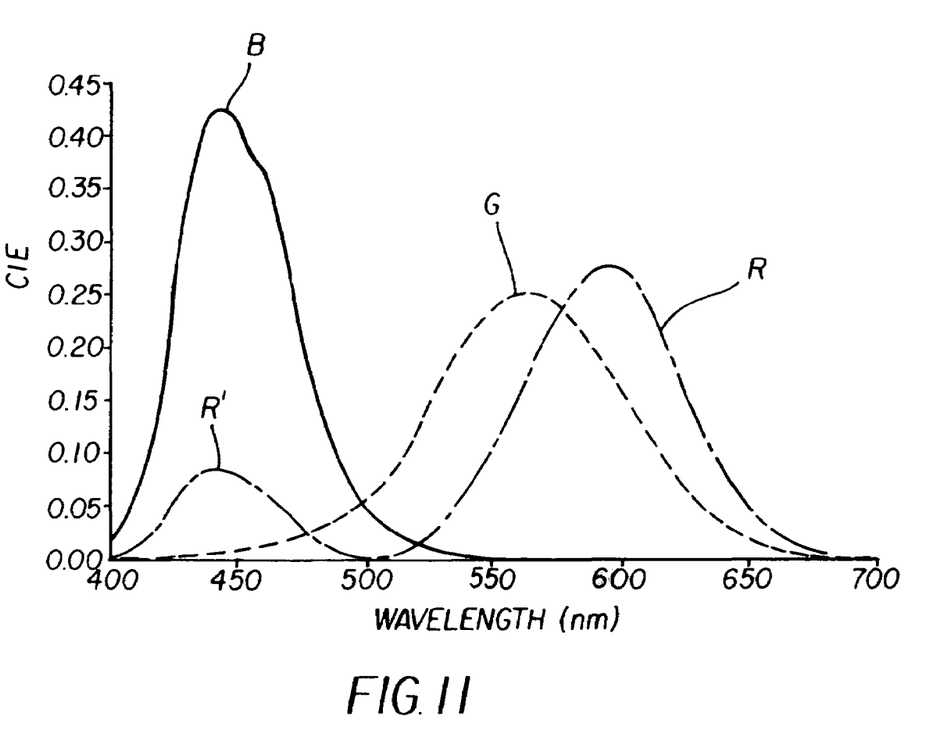
FIG. 11 is a plot of the red, green and blue components of the display sheet of FIG. 10 in the planar state.

FIG. 11 is a plot of the red, green and blue components of the sheet of FIG. 10 in the planar state, as perceived by the human eye. The areas under each color curve were approximately equal for all three color channels, and the sheet, therefore, had a neutral, light grey appearance. When the test sheet was written into the focal-conic state, the material appeared to be a light blue. The visible difference between the two states was pleasing.

The invention can be practiced substituting materials and processes different from those used to generate the test sheet. Evaporated metals can be used in place of the printed silver. Displays are improved by using higher reflecting materials such as aluminum. The complementary pigments used in the test sheet can be replaced by one or more combinations of pigments or dyes to provide higher absorption of light in the planar reflective wavelengths while maintaining a constant blue reflection.

Displays can be made according to the present invention to comprise contrasting colors other than blue-neutral or blue-whitish, as will be understood by the skilled artisan. For example, magenta-white, red-white, and yellow-white combinations can be obtained, wherein the high reflectance state is "white" or whitish, meaning bright and substantially neutral and by the non-white colors is meant a darker tinted color. The peak wavelength of the cholesteric liquid-crystal material can be changed to provide selective reflection and transmission in other areas of the visible spectrum. For example, the peak wavelength can be adjusted to reflect only in the blue-green or intermediate wavelengths between the two colors. The cholesteric liquid-crystal material can be set to reflect primarily red light. In each case, complementary light-absorbing materials can be selected to provide high absorption in the wavelengths reflected in the planar state, and invariant portions for other wavelengths. In certain cases, the display can provide two contrasting colors/states neither of which are neutral. Usually in practice, however, it is preferable to have a neutral state that is as bright as possible. A cholesteric liquid-crystal material near 580 nanometers with a complementary blue pigment and a reflective second conductor provides a comparatively bright neutral contrast.

Processes can be used to create displays with complementary light-absorbing layers and reflective conductors using rigid substrates or multiple substrates. Displays can be built using this invention with a substrate moved to behind the reflective second conductor.

The invention has been described in detail with particular reference to certain preferred embodiments thereof, but it will be understood that variations and modifications can be effected within the spirit and scope of the invention.

PARTS LIST 10 display
15 display substrate
20 first conductors
30 cholesteric layer
35 complementary light-absorbing layer
40 second conductors
42 light absorber
60 incident light
62 planar reflected light
64 complementary light
72 planar liquid crystal
74 focal conic liquid crystal
P Planar state
FC Focal-Conic state
R Red or Tri-Stimulus X reflectance
R' Red excitation by short wavelength
G Green or Tri-Stimulus Y reflectance
B Blue or Tri-Stimulus Z reflectance

What is claimed is:

1. A display comprising, in order from front to back wherein the front of display is viewable by an observer, the following:
   a) an optional substrate;
   b) transparent first conductors;
   c) An imaging layer comprising polymer-dispersed cholesteric liquid-crystal material transmitting light in a focal-conic state and reflecting light in a planar state to provide a liquid-crystal-derived first reflected light reaching the observer, and
   d) a complementary light-absorbing layer;
   e) a reflective surface reflecting light passing through the imaging layer and the complementary light-absorbing layer, back through the complementary light-absorbing layer, thereby providing a color-filtered second reflected light reaching the observer; and
   f) second conductors optionally forming said reflective surface; wherein the complementary light-absorbing layer has a light absorbance such that, when the liquid-crystal material is in the planar state, the total reflected light reaching the observer, comprising both the liquid-crystal-derived first reflected light and the color-filtered second reflected light, is substantially more neutral than the liquid-crystal-derived light alone without the color-filtered second reflective light.

2. The display of claim 1 wherein the total reflected light from the display sheet with the imaging layer in the planar state has CIE tristimulus values X, Y and Z that are 20 percent closer to each other than the CIE tristimulus values of the liquid-crystal-derived light alone without the color-filtered second reflected light.

3. The display of claim 1 wherein the color-filtered second reflected light is substantially complementary to the liquid-crystal-derived first reflected light, thereby providing a total reflected light reaching the observer that is substantially neutral when the liquid-crystal material is in the planar state.

4. The display of claim 3 wherein the substantially neutral light exhibits CIE tristimulus values X, Y and Z that are within 20 percent of each other.

5. The display of claim 1 wherein the reflective surface for providing said color-filtered second reflected light is located immediately adjacent to the complementary light-absorbing layer.

6. The display of claim 1 wherein when the cholesteric liquid-crystal material is in the planar state a substantially neutral color is perceived by the observer, and when the cholesteric liquid-crystal material is in the focal-conic second state, a blue or bluish color is perceived by the observer.

7. The display of claim 1 wherein the complementary light-absorbing layer is less than 1 micrometer thick.

8. The display of claim 1 wherein the reflective surface reflects at least 50% of the light reaching it.

9. The display of claim 1 wherein the first and second conductors are patterned to produce an addressable matrix.

10. The display of claim 1 wherein said imaging layer comprises a cholesteric liquid-crystal material dispersed in a matrix comprising gelatin.

11. The display of claim 1 wherein the complementary light-absorbing layer comprises two or more differently hued pigments.

12. The display of claim 1 wherein at least one of the transparent first conductors comprises polythiophene.

* * * * *